United States Patent [19]
Kawai

[11] 4,081,505
[45] Mar. 28, 1978

[54] METHOD OF COMPRESSING A MATERIAL UNDER HIGH PRESSURE

[76] Inventor: Naoto Kawai, 4-3-1 Midorigaoka, Toyonaka, Osaka, Japan

[21] Appl. No.: 722,704

[22] Filed: Sep. 13, 1976

[51] Int. Cl.$^2$ .............................. B30B 7/04
[52] U.S. Cl. .................... 264/313; 264/320; 264/332; 425/405 H; 425/406
[58] Field of Search ............... 264/332, 320; 425/405 H, 406

[56] References Cited
U.S. PATENT DOCUMENTS

| | | | |
|---|---|---|---|
| 2,990,602 | 7/1961 | Brandmayr | 264/332 |
| 3,154,619 | 10/1964 | Brayman et al. | 264/313 |

FOREIGN PATENT DOCUMENTS 1,360,281  7/1974  United Kingdom ............... 264/332

OTHER PUBLICATIONS

Kawai et al., "A New Device for Pressure Vessels", Pror. Jap. Acad., vol. 49 (1973), p. 623–626.

*Primary Examiner*—Robert F. White
*Assistant Examiner*—John A. Parrish

[57] ABSTRACT

Ultra-high pressure generation by using a new pressure transmitting medium consisting essentially of powder of an inorganic material having high hardness and cleavage.

9 Claims, 13 Drawing Figures

INITIAL STAGE

INTERMEDIATE

FINAL STAGE

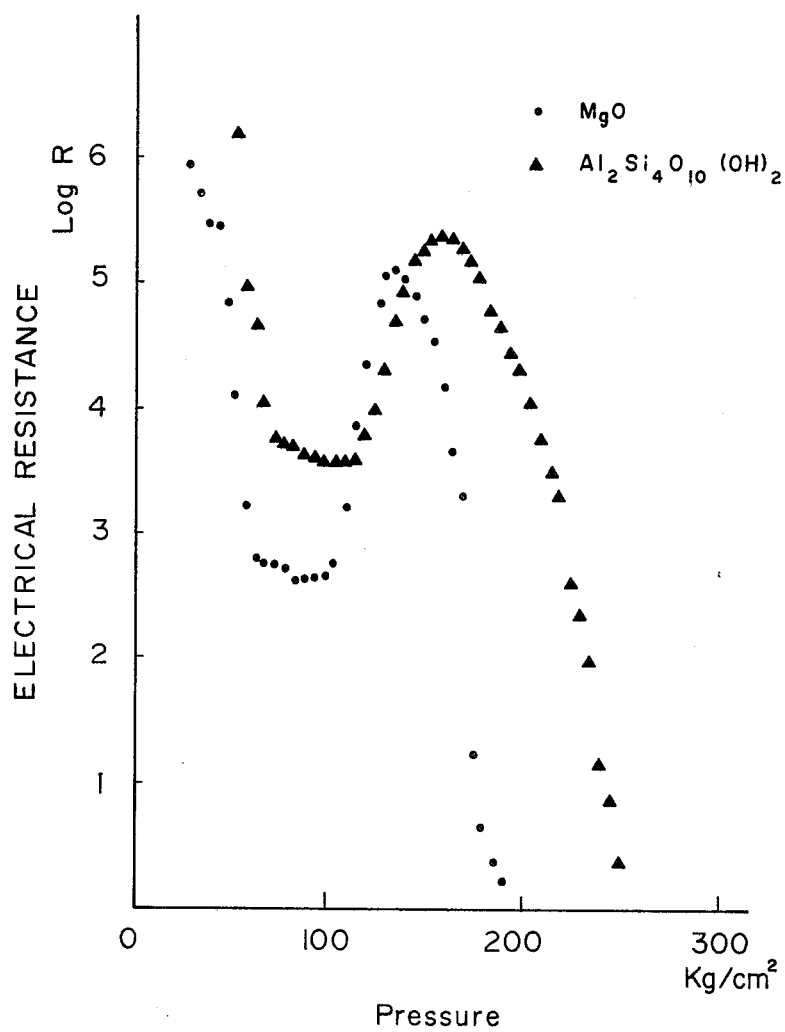

METHOD OF COMPRESSING A MATERIAL UNDER HIGH PRESSURE

The present invention relates to an improved method of compressing a material under high pressure, in particular under ultra-high pressure.

The method of compressing a material to be compressed by means of a ultra-high pressure generating apparatus usually comprises the steps of introducing the solid pressure transmitting medium within which is embedded the material to be compressed into the pressure chamber of the pressure vessel of the ultra-high pressure generating apparatus which is consisted of a piston cylinder or sliding multi-anvils or the like, and causing to contract the pressure chamber of the pressure vessel whereby the material to be compressed which is embedded in the solid pressure transmitting medium is compressed through said medium. Such a solid pressure transmitting medium which is conventionally used is a material having relatively low hardness and having few voids such as pyrophyllite.

The compression efficiency which can be achieved by means of the known method mentioned above, namely pressure magnification ratio of the ultra-high pressure generating apparatus is proportional to the ratio S/s, in which S means the outer surface of the pressure vessel receiving the external pressure and s means the inner surface of said pressure vessel contacting with the pressure transmitting medium. In such a case, it is known that the conventional pressure transmitting medium such as pyrophillite acts simply as a isotropic fluid-like medium so that scarcely contributes to the pressure magnification ratio.

Consequently the ultra-high pressure degree which could be achieved by the known method was restricted below some limit so that it was quite impossible to obtain metallic hydrogen or the like by means of the known method.

Considering the above, one object of the present invention is to provide a method of compressing any material by which the compression efficiency, namely the pressure magnification ratio can be extremely improved.

An another object of the present invention is to provide a new pressure transmitting medium which can be introduced into all types of pressure vessels.

An another object of the present invention is to provide a method of generating ultra-high pressure without causing damage to the pressure vessel.

Other objects, features and advantages of the present invention will appear more clearly from the following detailed description of preferred embodiments thereof made with reference to accompanying drawings in which:

FIG. 4 is a perspective view of the anvil consisting of the pressure transmitting medium of the present invention which is formed on the parts of a six-split sphere.

FIG. 8 is TEST RESULT curves showing electrical resistance (R) change of ZnTe as Calibrant.

Figure 1:
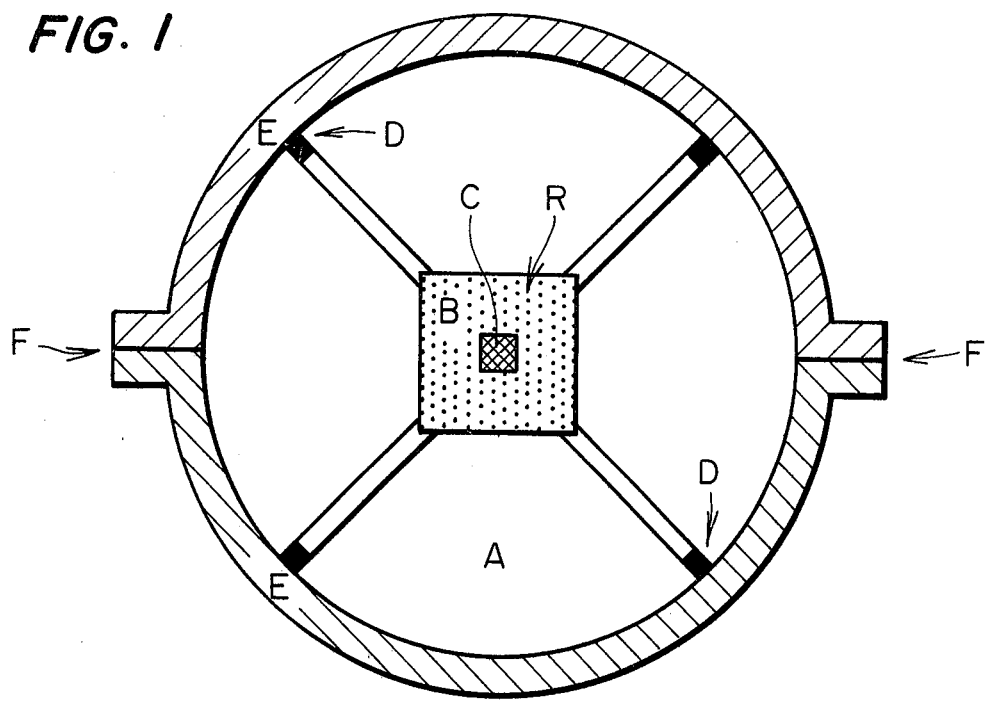
FIGS. 1 – 3 are cross-sectional view of a pressure vessel showing respectively the condition of the initial stage, of the intermediate stage and of the final stage of the present invention.

Referring now to the drawings, FIG. 1 shows the condition of the initial stage of the compression according to the method of the present invention in which six parts A of a six-split sphere are assembled to form a high pressure vessel. And the pressure transmitting medium B of the present invention is contained in the pressure chamber R of the vessel. In the center of the medium is embedded a cubic material C to be compressed (hereinafter referred to as the sample for brevity). Letter D indicates a suitable spacer such as a card board spacer or the like, and letter E indicates a pair of an upper and a lower semi-spherical shells made of rubber and covering the high pressure vessel (assembled sphere). The semi-spherical shells having their joining faces F tightly secured by means of an adhesive contract in the compression fluid.

Pressure transmitting medium B is consisted essentially of powder of an inorganic material having high hardness and cleavage.

Examples of preferable inorganic materials according to the present invention are MgO, diamond, boron, cubic BN, BeO, $TiO_2$, $ZrO_2$, WC, TiC, $B_4C$ and $Al_2O_3$. An example of the natural material which can be used as the pressure transmitting medium of the present invention is porous sandstone-like sedimentary rock. The common property of these inorganic materials is that they are crisp and consequently they are easily pulverized by an external force while having high hardness.

For example, MgO single crystal possesses six planes of cleavage, each being equivalent to (001), so the crystal is quite crisp and easily pulverized by a small shearing stress while the crystal has high hardness.

The pressure transmitting medium B may be prepared in the form of powder or it may be preformed by semi-sintering or consolidation of powder in order to facilitate its manipulation.

For example, fine-grained MgO powder is sintered for about 2 hours at the temperature of about 1,300° C to form many-voided aggregate of the density of 2.3 g/$cm^3$ and this aggregate may be shaped into a desired form.

Or, fine-grained diamond particles are mixed together using dilute epoxy resin in an agate mortar so that the mixture may be desirably shaped, when consolidated in the mold.

Figure 2:
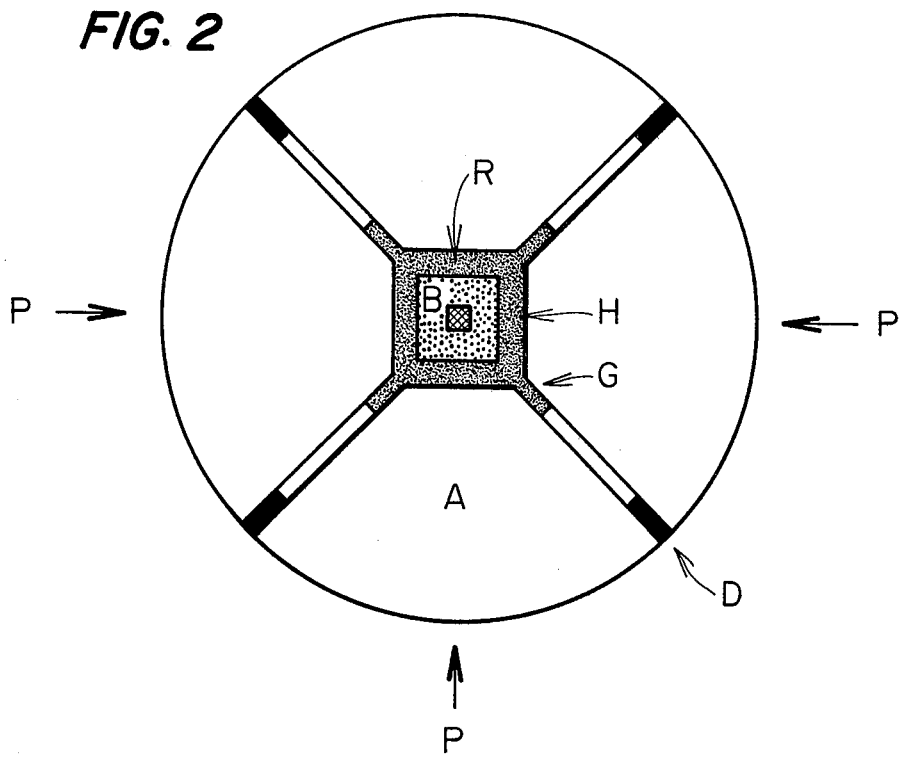

FIG. 2 shows the state of the intermediate stage of the compression according to the method of the present invention (semi-spherical shells E are not shown), in which the contraction of the pressure chamber R of the pressure vessel (assembled sphere) is proceeded to some extent by the external pressure P and the voidless area H is started to be formed in the pressure transmitting medium B from its outer portion toward its inner portion, in which area the void reduction can be observed. At this stage, a part of air in the pressure transmitting medium and in the pressure chamber starts to flow through the clearance of the split parts to become a outflow medium G.

Figure 3:
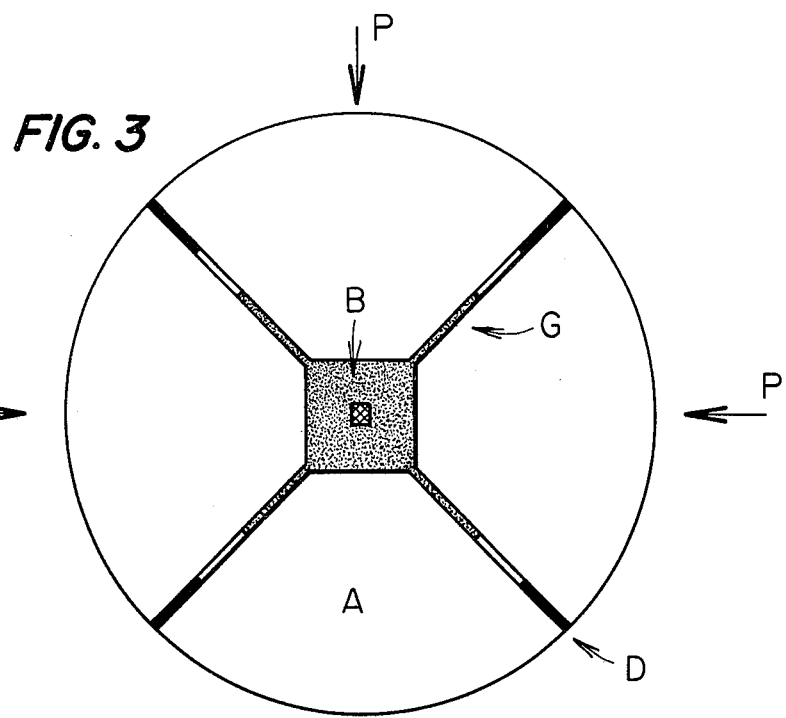

FIG. 3 shows the state of the final stage of the compression according to the method of the present invention in which the pressure transmitting medium B has been made voidless completely, and the density of the pressure transmitting medium approaches to its inherent density (true specific gravity).

FIG. 4 shows in further detail the state inside the pressure chamber at the stage shown in FIG. 3, in which the voidless element H in the form of a pyramid having its topmost portion cut off is formed in close contact with the top end face S of the parts A of a split sphere and the top end face I of the element is contacting with the sample C.

As a result it can be understood that in such a case the pressure magnification ratio is not proportional to S/s, but is substantially proportional to S/I.

In this manner, according to the present invention, the pressure transmitting medium B within the pressure chamber is forced to form six voidless pyramid-like anvils at the final stage, and the group of these anvils consisting of the pressure transmitting medium accomplishes the action of pressure magnification very effectively almost without flowing except at the proximity of side planes of each anvil.

Consequently, the pressure medium of the present invention may be also considered as a growing anvil. So, when MgO is used for example, the voidless element H is equivalent to the completely-sintered MgO which is semi-transparent and has the specific gravity approaching its true specific gravity, and the ultra-high pressure can be easily generated without causing damage to the pressure vessel.

According to the method of the present invention, the metallization of hydrogen or $H_2O$ which was difficult in the past can be easily achieved by means of the usual ultra-high pressure generating apparatus.

Figure 5A:
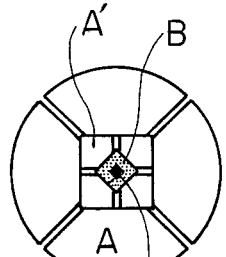
FIGS. 5 – 7 are cross-sectional views of other embodiments of the arrangement of the pressure vessel which can be used in the method of the present invention.
Figure 5E:
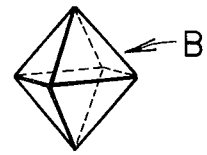
Figure 5B:
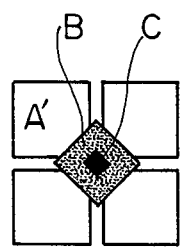
Figure 5C:
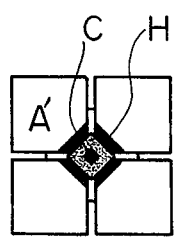
Figure 5D:
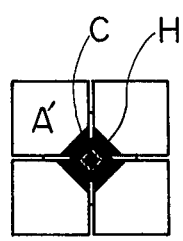
Figure 6:
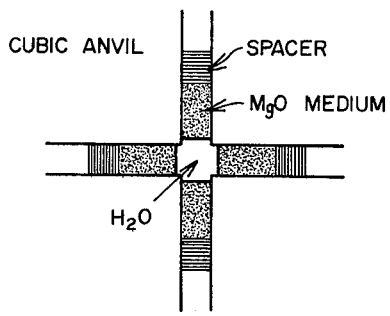

Other embodiments of the arrangement of the pressure vessel are shown in FIGS. 5 - 7.

In FIG. 5a, A' indicates an inner cubic anvil and the other letters have the same meanings as defined hereinbefore. FIGS. 5b - 5d show respectively the state of each stage of the compression by means of this pressure vessel. FIG. 5e shows the pressure transmitting medium B (for example, semi-sintered MgO) which has been shaped into an octahedral form.

FIG. 6 is a cross-sectional view of one embodiment of the arrangement of the pressure vessel which can be used when metallizing $H_2O$ according to the present invention. In this embodiment the cubic anvil may be consisted of WC or steel.

Figure 7A:
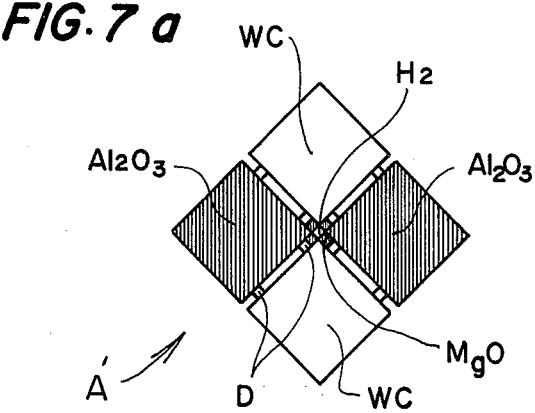
Figure 7B:
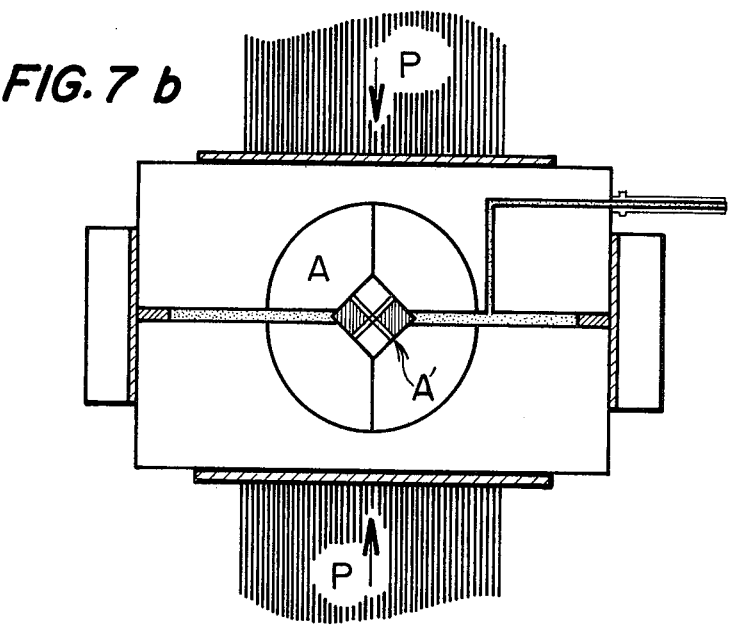

FIG. 7 is a cross-sectional view of one embodiment of the arrangement of the pressure vessel which can be used when metallizing $H_2$ according to the present invention. FIG. 7a shows inner cubic anvils A' made of WC and sintered $Al_2O_3$ and FIG. 7b shows the state in which the inner cubic anvils A' are mounted within the assembled sphere consisting of the parts A of a split sphere and are compressed by the external pressure P by means of pistons.

TEST EXAMPLE

PREPARATION OF PRESSURE TRANSMITTING MEDIUM

Fine MgO particles have been semi-sintered at 1,300° C for about 10 hours till its density increases up to 2.3. The quenched block contains still so many voids uniformly distributed that an ordinary machine tool can work well upon it. A new pressure transmitting medium is made of this material as shown in FIG. 5e. Besides, a pyrophyllite medium with similar shape and dimension is carefully prepared.

COMPARATIVE TEST RESULTS

In the center of each medium a pressure calibrant ZnS is embedded. The two specimens are compressed at room temperature within a spherical pressure vessel (split sphere with eight cubic anvils) as shown in FIG. 5a.

The metallic transition of the calibrant is observed under an external oil pressure of $100kg/cm^2$ in pyrophyllite, whereas it occurs under only one half of that pressure in the new medium.

Next a similar comparison has been carried out using GAP as calibrant. The metallic transition occurs at $60kg/cm^2$, in the new medium in contrast with $460kg/cm^2$ required in pyrophyllite.

The results are summarized in the TABLE below.

TABLE

| | External Pressure for metalic transformation of ZnS | External Pressure for metalic transformation of GaP |
|---|---|---|
| MgO (0.02) CC | 50 kg/cm² | 60 kg/cm² |
| pyrophyllite (0.02) CC | 100 kg/cm² | 460 kg/cm² |

To reconfirm the high efficiency a well known electrical change of ZnTe has been tested in the same way as before. The results are summarized in FIG. 8.

ZnTe has three phase transitions under increasing pressure at room temperature. It first drops at 80kbar, jumps up at 110kbar, and finally drops again abruptly at 130kbar. The curve obtained within the new medium resembles that obtained within pyrophyllite before the load reaches $60kg/cm^2$. On loading further, however, the first kink foregoes slightly, but the second one goes further in the MgO medium. The final drop is completed MgO even before it starts in pyrophyllite. To understand the quick pressure rise in MgO, one must assume an existence of an inward pressure rise whose gradient is gentle in the beginning, but becomes progressively steep.

The voids within the shrinking MgO medium have been examined under the ordinary microscope. They are diminished and soon turn out to be invisible. Some part of the medium becomes semi-transparent, too. The void reduction is not taking place uniformly in the medium, it initiates in the proximity to the anvils and then goes further away. A solid octahedral shell is, therefore, formed and soon thickens till each calibrant is completely surrounded (FIG. 5d). When outer part of the MgO octahedron extrudes out into the interfaces between anvils, air filling in the nearby voids comes out together. However, the remaining air, especially that trapped in closed voids is liquefied and eventually solidified at pressure above 30kbar and stays therein. A completely non-void block is made before the highest internal pressure is attained. MgO single crystal possesses six planes of cleavage, each being equivalent to (001). Therefore, the crystal is quite crisp, being pulverized by a small shearing stress. In the outer part of compressed medium white thin layers are recognizable with the naked eye. They are lying on three sheared planes (mutually perpendicular and parallel to the anvil faces). When an outer shell of the MgO octahedron extrudes, pulverized particles move along the planes, although the amount becomes smaller very quickly. In consequence of this flow, the octahedron looks as though split up into eight quasi-tetrahedrons whose each center makes a fine contact with the calibrant. Since the center of each tetrahedron has a very limited area in case the calibrant is small, each tetrahedron plays the leading role in both the transmission and magnification of external oil pressure. It is nothing but a growing anvil with a top progressively sharpened, and three shoulder surfaces supporting mutually. By using a relatively large MgO medium I can prevent the rupture of anvil made of expensive tungsten carbide without sacrificing the pressure-volume attainability.

As other media alternative, I have used aggregated hard powders of diamond, boron, cubic BN, BeO, $TiO_2$, $ZrO_2$, WC, TiC, $B_4C$, etc., differing widely in hardness and cleavage. Their behaviors are the same as with MgO.

On the other hand, the new media show almost similar effect in such pressure vessels as the classical piston-cylinder or any new sliding multi-anvils.

What I claim is:

1. A method of compressing a sample under ultra-high pressure comprising the steps of:
   a. embedding said sample to be compressed in a pressure transmitting medium consisting essentially of powder of an inorganic material having high hardness and cleavage, the pressure transmitting medium having voids therewithin;
   b. inserting the pressure transmitting medium and the embedded sample in a central pressure chamber of a pressure vessel, the pressure vessel comprising a plurality of spherical segments which are movable radially inwardly relative to each other toward the center of the pressure vessel;
   c. applying external pressure to the pressure vessel to force the spherical segments radially inwardly toward the center of the pressure vessel to:
      i. compact the pressure transmitting medium;
      ii. reduce the voids in the pressure transmitting medium; and
      iii. progressively reduce the area of contact between the sample and the pressure transmitting medium which is being forced inwardly by each spherical segment,
   whereby the ratio between the external area of the pressure vessel and the area of contact between the sample and the pressure transmitting medium progressively increases and the magnification between the external pressure and the pressure exerted on the sample by the pressure transmitting material is progressively increased so that ultra-high pressure is applied to the sample.

2. The method of claim 1 wherein said inorganic material is selected from the group consisting of MgO, diamond, boron, cubic BN, BeO, $TiO_2$, $ZrO_2$, WC, TiC, $B_4C$ and $Al_2O_3$.

3. The method of claim 1 wherein said powder of the inorganic material is semi-sintered into a suitable shape prior to the embedding step.

4. The method of claim 3 wherein said powder is semi-sintered into an octahedral shape prior to the embedding step.

5. The method of claim 3 wherein said inorganic material is MgO.

6. The method of claim 1 wherein said powder of the inorganic material is desirably shaped by consolidation with a small amount of resinous binder.

7. The method of claim 6 wherein said inorganic material is diamond.

8. The method of claim 1 including the step of inserting inner cubic anvils between the pressure transmitting medium and the spherical segments before the external pressure is applied.

9. A method of compressing a sample under ultra-high pressure comprising the steps of embedding said sample to be compressed in a pressure transmitting medium consisting essentially of powder of an inorganic material having high hardness and cleavage, the pressure transmitting medium having voids therein, and subjecting said pressure transmitting medium to external high pressure surrounding the pressure transmitting medium and directed radially inwardly toward the sample to reduce voids in said medium so as to transform said medium to a plurality of growing anvils of medium solidified from outer to inner direction and with the top of each anvil progressively sharpened whereby said sample embedded in said medium is subjected to an ultra-high pressure generated by the transmission and magnification of said external high pressure through said growing anvils of said medium.

* * * * *